United States Patent [19]
Martinovich et al.

[11] Patent Number: 4,888,227
[45] Date of Patent: Dec. 19, 1989

[54] ZINC TITANATE IN POLY(ARYLENE SULFIDE) COMPOSITIONS

[75] Inventors: Robert J. Martinovich; John E. Leland, both of Bartlesville, Okla.

[73] Assignee: Phillips Petroleum Company, Bartlesville, Okla.

[21] Appl. No.: 246,389

[22] Filed: Sep. 19, 1988

Related U.S. Application Data

[62] Division of Ser. No. 612,537, May 21, 1984, Pat. No. 4,798,863.

[51] Int. Cl.$^4$ .................................................. B32B 1/04
[52] U.S. Cl. ........................................ 428/76; 524/413; 524/456; 524/609; 525/537; 428/901; 174/52.2
[58] Field of Search ...................... 524/413, 456, 609; 525/537; 428/76, 901; 174/52.2

[56] References Cited

U.S. PATENT DOCUMENTS

| | | | |
|---|---|---|---|
| 3,551,197 | 12/1970 | Lindquist, Jr. | 524/413 |
| 3,936,412 | 2/1976 | Rocholl | 524/413 |
| 4,073,765 | 2/1978 | Katchman et al. | 524/413 |
| 4,645,826 | 2/1987 | Iizuka et al. | 525/537 |
| 4,798,863 | 1/1989 | Leland et al. | 524/413 |

FOREIGN PATENT DOCUMENTS 0067676 12/1982 European Pat. Off. .
0119607  9/1984 European Pat. Off. .

OTHER PUBLICATIONS

Short et al, "Polyphenylene Sulfide Coating and Molding Resin", Chemtech, vol. 2, Aug. 1972, pp. 481–485.

Primary Examiner—Thurman K. Page
Assistant Examiner—P. J. Ryan
Attorney, Agent, or Firm—Richmond, Phillips, Hitchcock & Umphlett

[57] ABSTRACT

Zinc titanate is used in poly(arylene sulfide) compositions to improve encapsulation properties. Electronic components are encapsulated with poly(arylene sulfide) compositions containing zinc titanate.

13 Claims, No Drawings

ZINC TITANATE IN POLY(ARYLENE SULFIDE) COMPOSITIONS

CROSS REFERENCE TO RELATED APPLICATION

This application is a division of application Ser. No. 612,537, filed May 21, 1984, (not allowed) U.S. Pat. No. 4,798,863.

BACKGROUND OF THE INVENTION

This invention relates to poly(arylene sulfide) compositions. In one aspect this invention relates to electronic components encapsulated with poly(arylene sulfide) compositions.

Electronic components are encapsulated to maintain electrical insulation, to provide mechanical protection and to otherwise shield the component from exposure to its environment. There is an on-going effort to discover new and improved encapsulation materials. A relatively recent development has been the use of poly(arylene sulfide) compositions as encapsulating materials.

It is desired to provide new and improved poly(arylene sulfide) encapsulation compositions to protect electronic components.

OBJECTS OF THE INVENTION

It is one object of this invention to improve the reliability and increase the life of electronic components encapsulated with poly(arylene sulfide) compositions.

It is another object of this invention to provide improved encapsulation compositions and electronic components encapsulated therewith.

Other objects, advantages and aspects of this invention will become apparent to persons skilled in the art upon study of this disclosure and the appended claims.

SUMMARY OF THE INVENTION

It has been discovered that the addition of zinc titanate to poly(arylene sulfide) compositions can improve the reliability and protection of electronic components encapsulated therewith.

DETAILED DESCRIPTION OF THE INVENTION

In accordance with certain aspects of this invention a composition is provided containing poly(arylene sulfide) and zinc titanate. In other aspects, this invention includes electronic components encapsulated in the above-described composition.

The poly(arylene sulfide) compositions which are especially well suited for successful use as encapsulation compositions generally comprise poly(arylene sulfide), zinc titanate, and frequently reinforcement and filler. These compositions can optionally contain relatively small amounts of other components, for example, hydrogenated conjugated diene/monovinyl-substituted aromatic copolymers, organosilanes, pigments, flow improvers and processing aids. Where these components are present, they will usually only amount to up to a few weight percent of the total composition.

Compositions used for the encapsulation of active components, for example, integrated circuits, transistors and diodes, comprise about 25 to about 45 wt.% poly(arylene sulfide), preferably about 32 to about 38 wt.%;

about 0.1 to about 10 wt.% zinc titanate, preferably about 0.5 to about 5 wt.%;

about 5 to about 30 wt.% reinforcement, preferably about 10 to about 20 wt.%;

about 40 to about 60 wt.% filler, preferably about 45 to about 55 wt.%.

These ingredients are based upon the total weight of the composition. Using the ingredients within the preferred range is expected to provide best results.

The viscosity of the composition used for encapsulation of active components preferably should not exceed about 800 poise as measured in accordance with ASTM 3835 because encapsulation of active electronic components with compositions having viscosities in excess of about 800 poise can cause damage to the components. Usually the viscosity of the composition will range from about 150 to about 500 poise for active components other than delicate components such as integrated circuits with wire leads. With respect to delicate components the viscosity of the encapsulation composition is preferably below about 150 poise. Preferably the viscosity of the composition for the encapsulation of delicate active components will generally range from about 75 to about 150 poise.

Although viscosity of the composition depends on a number of factors, to obtain composition viscosities below about 800 poise the viscosity of the poly(arylene sulfide) component should generally not exceed about 130 poise and will usually be less than 70 poise. To obtain composition viscosities within the desired range for encapsulating delicate active components, the viscosity of the poly(arylene sulfide) component will usually be less than about 25 poise.

Preferred reinforcements include fibers such as glass fibers or calcium silicate fibers.

Silica is the preferred filler, although talc, glass, clay, mica, calcium sulfate and calcium carbonate are also acceptable. The silica can be amorphous silica or crystalline silica. Silica is commercially available as a finely ground material in a range of mesh sizes. Commercial silica is typically made up of about 99.5 wt.% $SiO_2$ with $Al_2O_3$, $Fe_2O_3$, $Na_2O$ and $K_2O$ as the remaining components.

Compositions used for the encapsulation of passive components, such as capacitors, resistors and resistor networks generally contain more reinforcement and less filler than compositions for the encapsulation of active components. A suitable composition comprises:

about 25 to about 45 wt.% poly(arylene sulfide), preferably about 32 to about 38 wt.%;

about 0.1 to about 10 wt.% zinc titanate, preferably about 0.5 to about 5 wt.%;

about 20 to about 50 wt.% reinforcement, preferably about 25 to about 45 wt.%; and about 18 to about 38 wt.% filler, preferably about 23 to about 33 wt.%.

These ingredients are based upon the total weight of the composition.

The viscosity of the composition used for encapsulation of passive components should generally not exceed about 1200 poise to avoid damage to the components. The viscosity of the composition will generally range from about 500 to about 800 poise. The viscosity of the poly(arylene sulfide) component should generally not exceed about 300 poise. Generally the viscosity of the poly(arylene sulfide) component will range from about 190 to about 300 poise.

Reinforcements, fillers and other ingredients can be of the same identity as for the encapsulation of active components.

Suitable pigment can be selected from monoazo nickel complexes, iron oxide, lead chromate, cadmium sulfo-sulfide and combinations thereof.

The compositions of this invention can be made in accordance with any method wherein the poly(arylene sulfide), zinc titanate and other components (if any) are combined to form a mixture. Many suitable methods are well known to those of skill in the art. By way of example, the components of the composition can be mixed together at room temperature in a rotating drum blender or in an intensive mixer such as a Henschel mixer and then extrusion compounded at a temperature above about the melting point of the poly(arylene sulfide) to produce a uniform blend.

Once made, the composition can be used to encapsulate electronic components in accordance with any encapsulation method suitable for thermoplastic encapsulation compositons. Such methods are well known in the art. The composition can be heated to a temperature of at least about the melting point of the poly(arylene sulfide) and then used to encapsulate electronic components. The coposition can, for example, be introduced into an injection molding apparatus to produce a melt which is extruded into an injection mold wherein the electronic component to be encapsulated is positioned. Transfer molding processes are also acceptable.

Poly(arylene sulfide) designates arylene sulfide polymers. Uncured or partially cured poly(arylene sulfide) polymers, copolymers, etc. can be used in the practice of this invention. The partially cured polymer has been heated to irreversibly increase its viscosity. Some examples of poly(arylene sulfide) suitable for the purposes of this invention include poly(2,4-tolylene sulfide), poly(4,4'-biphenylene sulfide) and poly(phenylene sulfide). Because of its availability and desirable properties, poly(phenylene sulfide) is the presently preferred poly(arylene sulfide).

Most any zinc titanate consisting essentially of zinc, titanium and oxygen is believed suitable for use in the invention. Two zinc titanates suitable for use in the invention comprise powdered zinc titanates represented by the formulas $Zn_2TiO_4$ and $ZnTiO_3$. The preferred zinc titanate is characterized by a spinel structure, and can be made as set forth in the example.

The weight ratio of poly(arylene sulfide) in the composition to the weight of zinc titanate in the composition will be between about 2.5:1 and about 450:1, usually between about 20:1 to 200:1.

In selecting a filler the following factors should be considered:
(1) the electrical conductivity of the filler;
(2) the thermal stability of the filler at encapsulation temperatures; and
(3) the level of ionic impurities in the filler.

Suitable reinforcements include fibers of glass or calcium silicate (e.g. woolastonite). Examples of other reinforcements include glass or calcium silicate in nonfibrous form (e.g. beads, powders, grains, etc.) and fibers of other materials such as asbestos, ceramics, etc.

A hydrogenated conjugated diene/monovinyl-substituted aromatic copolymer can be included in the poly(arylene sulfide) composition. An example of such a copolymer is hydrogenated butadiene/styrene copolymer.

The electrical resistance and hydrolytic stability of the encapsulation compositions of this invention may be improved by the addition of an organosilane. Good results can be obtained with, for example, N-{2-[3-(trimethoxysilyl)propylamino]ethyl}-p-vinylbenzylammonium chloride. Organomercaptosilanes can also be used for this purpose. An example is 3-mercaptopropyltrimethoxysilane, $HSCH_2CH_2CH_2Si(OCH_3)_3$.

EXAMPLE I

Zinc titanate spinel can be prepared from a mixture of zinc oxide (ZnO) and titanium oxide ($TiO_2$). In preparing the mixture, 65 parts by weight of silica free zinc oxide on a dry basis (French process zinc oxide or equivalent) is uniformly mixed with 35 parts by weight silica free titanium oxide on a dry basis (flame hydrolyzed titania or equivalent). Following the mixing, the composition is water wetted and extruded, followed by grinding and sieving to the desired mesh range. The granules are then dried to less than 10% water by spreading ½ inch thick on a conveyor while passing air over the surface for 6 hours at 250° F. The granules are then sintered by heating in air according to the procedure below:

Heat to 1000° F. (±25° F.) in 2 hours and at 1000° F. for 2 hours, then to 1500° F. (±25° F.) in 2 hours and at 1500° F. for 3 hours.

Final sieving is for a compatible particle size for mixing with other desired ingredients as in Example II.

EXAMPLE II

The ingredients used in making an inventive composition and two comparative compositions are shown in Table I.

TABLE I

| Ingredients (Wt. %) | Composition 1 | 2 | 3 |
|---|---|---|---|
| [a] PPS | 34 | 34 | 34 |
| [b] Wollastokup | 14.6 | 14.6 | 14.6 |
| [c] Silica | 49.4 | 47.4 | 47.4 |
| [d] Phil Ad | 1 | 1 | 1 |
| [e] Silane 189 | 1 | 1 | 1 |
| [f] ZnO | | 1 | |
| [g] $ZnTiO_3$ | | | 1 |
| [h] Carbon black | | 1 | 1 |

[a] polyphenylene Sulfide, Ryton ®, Phillips Chemical Co. having a viscosity of about 17 poise as tested on a capillar rheometer at 650° F. and shear rate of 1000 $(sec)^{-1}$.
[b] Wollastonite, calcium silicate fibers sold under the trademark Wollastokup G187 0.5 by NYCo, division of Processed Minerals Inc., Willsboro, N.C.
[c] Silica, fused silica GP71 from Harbison Walker Refractories, division of Dresser Industries, Inc.
[d] Phil Ad VII, Hydrogenated 41 wt. % butadiene/59 wt. % styrene linear random copolymer with molecular weight of 125,000 (U.S. 3,554,911), Phillips Chemical Co.
[e] Silane A-189 ™ 3-mercaptopropyltrimethoxy silane from Union Carbide Corp.
[f] Zinc Oxide, French process zinc oxide manufactured by Pacific Smelting Co.
[g] Zinc titanate made as set forth in Example I
[h] Carbon black N110 sold by Phillips Chemical Co.

Each of the compositions was prepared as follows. The silica and silane were premixed. The silica/silane and the other components were added to a Henschel mixer and mixed until completely dispersed. The resultant mixture was passed through a Buss-Condux cokneader extruder at 570°-600° F. and pelletized.

Each composition was used to encapsulate integrated circuits (I.C.'s) in the manner described below. The pelletized material of the compositions was injection molded using a 75 ton Newberry molding machine (650° F. stock temperature, 275° F. mold temperature at 300 # injection pressure and 10% rate setting) onto 10 copper alloy integrated circuit lead frames. Each of the lead frames had 10 integrated circuit components. Composition 1 was used to encapsulate 13 integrated circuits and compositions 2 and 3 were used to encapsulate 12 integrated circuits. Each of the encapsulated lead frames was cut and trimmed into the individual integrated circuits. Each integrated circuit was a LM 101 linear operational amplifier. After encapsulation, the encapsulated portion of each integrated circuit measured about 0.5 inch×0.25 inch×0.125 inch.

Prior to encapsulation each integrated circuit was visually inspected for faults. Faulty integrated circuits were marked. Following encapsulation, cutting and trimming the marked (i.e. faulty) integrated circuits were discarded. Remaining for testing were 13 integrated circuits encapsulated with composition 1 and 12 integrated circuits encapsulated with compositions 2 and 3. These remaining circuits were subjected to a "Device Electric Yield" test.

The "Device Electric Yield" test is a test to determine the percentage of integrated circuits that were successfully encapsulated. This test was conducted as follows. The encapsulated integrated circuits were placed on a Teflon board consisting of individual zero force insertion sockets. The sockets were connected to an Idea Box (manufactured by Global Specialties) which was equipped with a 5-volt power source and a signal generator. The Idea Box was also connected to a monitor (Oscilloscope, Model 222A, Hewlett Packard). Failure or passage of each encapsulated integrated circuit was determined by the pattern on the oscilloscope. The pattern corresponding to each successfully encapsulated integrated circuit conformed with a standard pattern. Failure (i.e. unsuccessful encapsulation) was indicated by nonconformance with the standard pattern. All circuits encapsulated with each composition passed the test.

Of the successfully encapsulated integrated circuits of each composition, all were tested in accordance with a "Constant Test", also known as the "Pressure Pot Test with Bias". The integrated circuits were placed on an 8 inch×10 inch Teflon board equipped with sockets to receive the leads of the integrated circuits. The board also had electric leads to each circuit. The assembled board was placed in an autoclave at 115° C. and about 10 psig. The atmosphere in the autoclave was saturated with water vapor. A 30-volt potential was constantly applied across the power leads of the integrated circuits. The integrated circuits were periodically removed from the autoclave for testing as described above to determine if each integrated circuit was still functioning correctly. As the test progressed the number of failures after each time period was recorded. The results are given in Table II.

TABLE II

| Compositions: | Results Failures/tested | Autoclave (hrs. in) |
|---|---|---|
| 1 | 6 of 13 | 662 |
|  | 3 of remaining 7 | 827 |
|  | 2 of remaining 4 | 1325 |
| 2 | 0 of 12 | 662 |
|  | 0 of 12 | 827 |
|  | 0 of 12 | 1325 |
| 3 | 0 of 12 | 662 |
|  | 0 of 12 | 827 |
|  | 0 of 12 | 1325 |

Table II shows that most of the integrated circuit encapsulated with compositions without zinc titanate failed on or before 1325 hours. About half of the integrated circuits encapsulated with compositions not containing zinc titanate failed during testing at 662 hours. With respect to the integrated circuits encapsulated with compositions containing zinc titanate it is seen that no failure had occurred at 1325 hours. Composition 2, which contained zinc oxide instead of zinc titanate, provided results comparable to the present invention.

The results presented in Table II demonstrate the utility of zinc titanate in improving reliability and protection of encapsulated electronic components.

What is claimed is:

1. An encapsulated active electronic component comprising an electronic component encapsulated in a composition characterized by
   (i) about 25 to about 45 weight percent poly(arylene sulfide);
   (ii) about 0.1 to about 10 weight percent zinc titanate;
   (iii) about 5 to about 30 weight percent reinforcement; and
   (iv) about 40 to about 60 weight percent filler;
wherein said weight percentages are based upon the total weight of (i), (ii), (iii) and (iv); and wherein the viscosity of said composition does not exceed about 800 poise.

2. A component in accordance with claim 1 wherein said filler comprises silica; and wherein said reinforcement comprises glass fibers or calcium silicate fibers.

3. A component in accordance with claim 2 wherein (i) comprises poly(phenylene sulfide).

4. A component in accordance with claim 1 wherein the viscosity of said composition does not exceed about 150 poise.

5. An encapsulated passive electronic component comprising an electronic component encapsulated in a composition characterized by:
   (i) about 25 to about 45 weight percent poly(arylene sulfide);
   (ii) about 0.1 to about 10 weight percent zinc titanate;
   (iii) about 20 to about 50 weight percent reinforcement; and
   (iv) about 18 to about 38 weight percent filler;
wherein said weight percentages are based upon the total weight of (i), (ii), (iii) and (iv); and wherein the viscosity of said composition does not exceed about 1200 poise.

6. A component in accordance with claim 5 wherein said filler is selected from talc and calcium sulfate.

7. A component in accordance with claim 6 wherein said reinforcement is selected from glass fibers and calcium silicate fibers.

8. A component in accordance with claim 7 wherein (i) comprises poly(phenylene sulfide).

9. A composition in accordance with claim 5 wherein the viscosity is in the range of 500–800 poise.

10. A method comprising:
    (a) producing a mixture comprising at least (i) poly(arylene sulfide) and (ii) zinc titanate;
    (b) heating said mixture to a temperature of at least about the melting point of said poly(arylene sulfide); and
    (c) encapsulating an electronic component with said mixture.

11. A method as recited in claim 10 wherein said poly(arylene sulfide) comprises poly(phenylene sulfide).

12. A method as recited in claim 10 wherein said mixture produced in (a) further comprises (iii) reinforcement and (iv) filler.

13. A method as recited in claim 10 wherein the mixture contains poly(phenylene sulfide) and zinc titanate at a weight ratio in the range of 20:1 to about 200:1, and the zinc titanate is characterized by the formula $ZnTiO_3$ and a spinel structure.

* * * * *